United States Patent
Osinaike

(10) Patent No.: US 11,632,916 B2
(45) Date of Patent: Apr. 25, 2023

(54) PROPAGATING SOUND THROUGH BODIES OF WATER, TO GENERATE AND DIRECT WIND, FOR THE PURPOSE OF MODERATING AND AFFECTING WEATHER PATTERNS

(71) Applicant: Olatunbosun Osinaike, Chicago, IL (US)

(72) Inventor: Olatunbosun Osinaike, Chicago, IL (US)

( * ) Notice: Subject to any disclaimer, the term of this patent is extended or adjusted under 35 U.S.C. 154(b) by 1028 days.

(21) Appl. No.: 16/373,609

(22) Filed: Apr. 2, 2019

(65) Prior Publication Data

US 2020/0315104 A1    Oct. 8, 2020

(51) Int. Cl.
*A01G 15/00* (2006.01)
*G10K 11/20* (2006.01)

(52) U.S. Cl.
CPC ............ *A01G 15/00* (2013.01); *G10K 11/205* (2013.01); *B06B 2201/74* (2013.01); *G10K 2200/11* (2013.01)

(58) Field of Classification Search
CPC .. A01G 15/00; G10K 11/205; G10K 2200/11; B06B 2201/74
See application file for complete search history.

(56) References Cited

U.S. PATENT DOCUMENTS

| | | | | |
|---|---|---|---|---|
| 5,012,457 | A * | 4/1991 | Mitchell | H04R 9/06 367/175 |
| 2003/0085296 | A1 | 5/2003 | Waxmanski | |
| 2007/0270057 | A1 * | 11/2007 | Feldman | A01G 15/00 441/1 |
| 2010/0147206 | A1 | 6/2010 | Leonov | |
| 2010/0270389 | A1 * | 10/2010 | Feldman | A01G 15/00 239/14.1 |
| 2018/0023264 | A1 * | 1/2018 | Sainudeen | E02B 3/062 405/27 |
| 2019/0082623 | A1 | 3/2019 | Bednarczyk | |
| 2020/0315104 | A1 * | 10/2020 | Osinaike | A01G 15/00 |
| 2021/0163157 | A1 * | 6/2021 | Osinaike | B64G 1/44 |

FOREIGN PATENT DOCUMENTS

| | | | | |
|---|---|---|---|---|
| CN | 106044939 A | * | 10/2016 | ............... C02F 1/36 |
| CN | 205943293 U | * | 2/2017 | |

(Continued)

OTHER PUBLICATIONS

Michelangelo Buonarroti, The Last Judgment, Completed and Published in 1541, Sistine Chapel, Vatican City, Italy.

(Continued)

*Primary Examiner* — Daniel Pihulic

(57) ABSTRACT

This invention claims a patent on the process of propagating soundwaves through bodies of water, such as oceans, to produce and direct winds, for the purpose of managing aerial weather systems. Propagating soundwaves within water can generate and direct wind for many purposes. One purpose is to effectively weaken storms, by directing wind-shear against a storm's momentum, and stripping it of precipitation. Another purpose is to guide atmospheric rivers, and manually re-direct clouds in the precipitation cycle. This inventive process grants methods to mitigate dangerous weather patterns, such as droughts and hurricanes. The invention introduces a new subject matter that distinguishes it from other inventions relevant to underwater acoustics: manual processes to moderate weather.

4 Claims, 2 Drawing Sheets

(56) References Cited

FOREIGN PATENT DOCUMENTS

| CN | 206618073 U | * | 11/2017 | |
|---|---|---|---|---|
| CN | 107746094 A | * | 3/2018 | ................ C02F 1/36 |
| CN | 208008508 U | * | 10/2018 | ................ C02F 1/36 |
| CN | 109095695 A | * | 12/2018 | |
| CN | 211568243 U | * | 9/2020 | |
| RU | 2248115 | | 3/2005 | |
| WO | WO-2020204995 A1 | * | 10/2020 | ............. A01G 15/00 |

OTHER PUBLICATIONS

Government Sponsored Research Initiatives to weaken hurricanes: Project Cirrus: Dry-Ice to weaken Hurricanes Project Baton: Chemicals to weaken Hurricanes Project Storm-fury: Silver Iodide to weaken Hurricanes.
Research of Professor Usama Kadri (conflicts with part of original Claim 4, post-filing discovery).
Olatunbosun Osinaike, 'GOOSE,' Screenplay, 2015.
Olatunbosun Osinaike, Recreation of Michelangelo's Sistine Chapel Artwork, Published 2015.
Research of Professor Usama Kadri (conflicts with part of Claim 4, post-filing discovery).
Michelangelo Buonarroti, The Last Judgment, Completed and Published in 1541, Creation of Adam, Completed and Published in 1508, Sistine Chapel, Vatican City, Italy.
Raphael Sanzio, The School of Athens, The Parnassus, Raphael Rooms, Room of the Segnatura, 1509-1511, Vatican Museum, Vatican City, Italy.
Olatunbosun Osinaike, Valley of the Shadow, Screenplay, 2016.
Olatunbosun Osinaike, Metropolitan, Screenplay, 2014.

* cited by examiner

PROPAGATING SOUND THROUGH BODIES OF WATER, TO GENERATE AND DIRECT WIND, FOR THE PURPOSE OF MODERATING AND AFFECTING WEATHER PATTERNS

CROSS-REFERENCE TO RELATED APPLICATIONS

This substitute specification applies towards the nonprovisional application Ser. No. 16/373,609 (Apr. 2, 2019), which claims filing date of the provisional application 62/823,823 (Mar. 26, 2019)

STATEMENT REGARDING FEDERALLY SPONSORED RESEARCH OR DEVELOPMENT/STATEMENT REGARDING PRIOR DISCLOSURES BY THE INVENTOR

Applicant inventor Olatunbosun Osinaike disclosed the invention to $21^{st}$ Century Fox, and the Walt Disney Company on Oct. 10, 2018, for partnership with the Advocate Aurora Venture Fund, and the Catholic Church.

If an invention is in public use or publicly disclosed, an inventor is granted a grace period of 1 year to file for a patent on his invention.

The government would have manufactured parts and sponsored development in order to put the invention to use. Mr. Osinaike has not been formally contracted since disclosing the invention.

This patent is being filed to protect the inventors' rights as afforded to him by United States Patent Law, USPTO and international patent treaty law.

The inventor, Mr. Osinaike, is willing to enter a licensing deal for the use of his invention.

BACKGROUND OF THE INVENTION

This is a utility patent, pertaining to the use of soundwaves, to moderate, adjust and control weather patterns. The subject matter of the invention groups underwater acoustics, aerodynamics and weather.

It is a well-known scientific principle that sound travels faster in compressed liquids than in air. This is a natural law of physics, which is not patentable. However, there are many principle uses of sound in the field of underwater acoustics, that are patentable subject matter: radar, seismic exploration, and data collection to name a few. US Patent Law allows an inventor to patent newly discovered processes, and considers success against long felt but unsolved needs, sufficient consideration to justify patenting an invention.

The US is one of many countries that has long struggled to find a solution to weaken hurricanes. Additionally, climate change has made drought a considerable problem for many regions. This invention grants a process to mitigate both hurricanes and droughts, by directing wind, guiding precipitation, and affecting weather patterns.

This patent claims the invention of a process that propagates soundwaves underwater, to direct wind(s), and moderate weather patterns.

Mr. Osinaike's invention requires a crucial, necessary inventive step, which is not described in any prior art. Mr. Osinaike's invention depends on the choice to propagate soundwaves underwater, in order to shift and carry the air above the water. This is an inventive, non-obvious step, that distinguishes the inventor's concept from prior art. Patent Law requires that for prior art to prevent an invention from being patentable, it must sufficiently describe the claimed invention in such a manner that the invention would be obvious to a person with ordinary skill in the subject matter. Mr. Osinaike claims there is no prior art that makes the claimed processes obvious. Furthermore, the many failed attempts to weaken hurricanes demonstrate the new, useful, and non-obvious nature of the invention.

The original inventor, Olatunbosun Osinaike, disclosed the invention on Oct. 10, 2018, to $21^{st}$ Century Fox, now Fox Corporation, and the Walt Disney Company, for partnership with the Advocate-Aurora Venture Fund (Foxconn, Johnson Controls, Northwestern Mutual, and Advocate-Aurora Health Care), the Catholic Church, and a number of additional companies, listed in the first transmittal form.

BRIEF SUMMARY OF THE INVENTION

Sound travels at a much faster speed within a liquid than within gas.

Simply propagating sound through air, against a cloud or storm system, would not be as effective at mitigating and moderating weather patterns, as the claimed invention. Sound is less capable of shifting the molecules of air, as the molecules are further apart, and less compressed, than a liquid. It would take a tremendously loud, and possibly unbearable, propagation of sound in air, to have an effect on the weather.

The propagation of sound under water takes advantage of the compressed nature of the liquid. By propagating the sound within a body of water, the liquid medium is able to transfer the energy of the sound more rapidly, and efficiently. Sound causes water to move in the direction the sound is being propagated. The propagation of sound in water causes motion, forming compressions and rarefactions through the liquid. These waves are capable of shifting pockets of air between their peaks and troughs. Additionally, as sound is propagated through the liquid body of water, additional water evaporates, inheriting momentum from the propagation of sound, and creating a larger gust of wind to affect the weather.

The transfer of the sound's momentum through the water is sufficient to direct wind shear powerful enough to weaken storms, guide clouds and precipitation, and affect various other weather patterns.

1) Process to produce, propel and direct wind(s), by propagating sound within a body of water, for the purpose of affecting weather patterns:
   a. By propagating sound within a body of water, the sound forces the water to move in the direction(s) the sound is being applied.
   b. The propagation of sound creates compressions and rarefactions in the water, waves, which subsequently shift pockets of air in the direction they travel.
   c. Additional water evaporates due to the propagation of sound through the water. This vapor travels in the same direction the sound is applied, and creates a larger gust of wind to affect weather.

d. The shifting pockets of air, and the evaporating water, behave as directional winds, produced and guided by the propagation of sound. This wind can be utilized to affect weather patterns, as lower winds shift higher air systems.

The second and third drawings combine to illustrate the second claim, that propagating sound underwater can generate sufficient wind shear to weaken a storm system.

Figure 1:
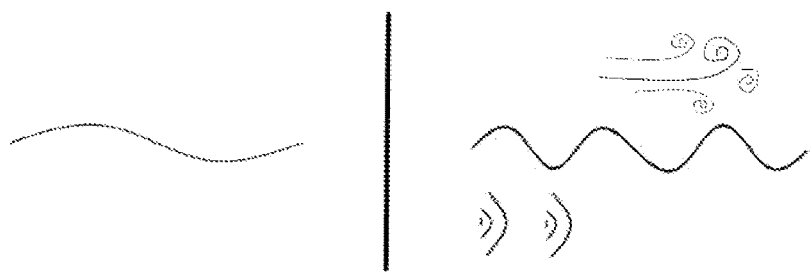
FIG. 1: The first drawing demonstrates the first claimed process of the patent, propagating sound through a body of water to generate wind. The figure demonstrates how propagating sound within a body of water, shifts pockets of air between the waves of water, as well as causes water to evaporate, forming 'directed wind(s),' which can be used to affect weather patterns.
Figure 2:
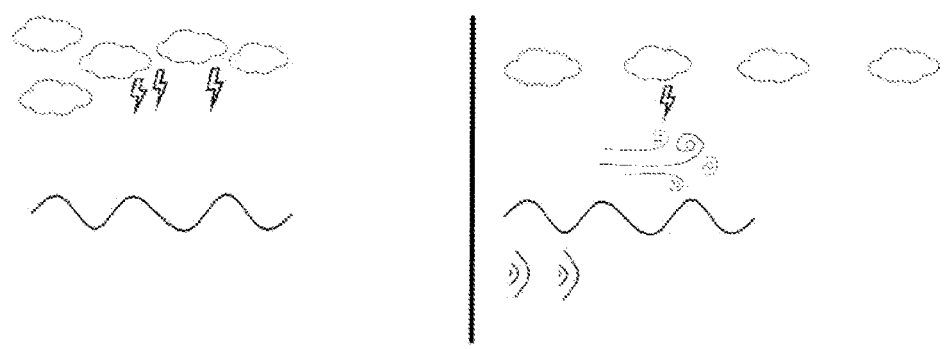

FIG. 2: The second drawing illustrates the second claim from a horizontal view, how directed winds can be utilized as wind shear, to strip precipitation from a storm system.

Figure 3:
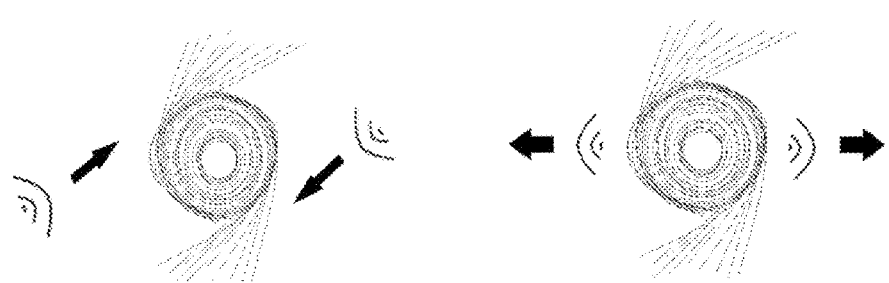

FIG. 3: The third drawing, also demonstrates the second claim, from an aerial view, demonstrating the propagation of sound in directions counter-current to a storm's angular momentum, as well as outward from the eye of the storm.

2) Process to produce and direct wind shear, for the purpose of weakening storm systems, by propagating sound within bodies of water:

a. Wind propelled by propagating sound within a body of water (claim 1), can be directed against a storm system, such as a hurricane.

b. Directing winds against a storm can weaken the storm system, by stripping the storm of clouds and precipitation, preventing the storm from maintaining precipitation/rain.

c. The best method is to apply the sound and wind counter-current to the storm's torque and rotation. Another method is to apply the sound and wind outward from the center of the storm.

d. Although the best method may be to apply the sound in a direction counter-current to the storm's rotation, the sound may be propagated in any direction(s) necessary to strip the storm of precipitation, based on various geographical and meteorological factors around the storm, like for example, simultaneous storms.

Figure 4:
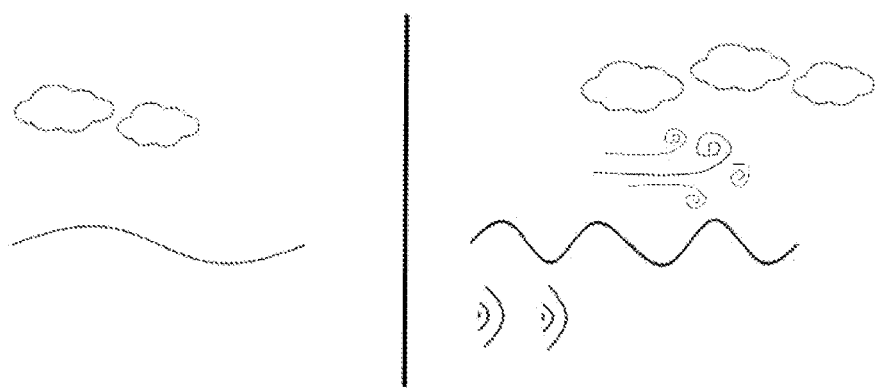

FIG. 4: The fourth drawing illustrates the third claim, how propagating sound through a body of water, can produce winds, which are used to shift and guide precipitation systems. The drawing illustrates the concept from a horizontal view. In the image, the winds carry the precipitous clouds from the 'left' side of the water, to the 'right,' to demonstrate the effect of the propagation of sound under water.

3) Process to transport water vapor, clouds, precipitation, and atmospheric rivers in a desired direction(s), by propagating sound within the body of water beneath:

a. Propagating sound within water can generate and direct wind (claim 1) that affects weather patterns. These winds carry their own moisture.

b. The lower winds being directed by the propagation of sound, then also shift clouds and air systems higher in the atmosphere, or along the same altitude.

c. This process may be utilized to guide precipitation systems, and adjust precipitation cycles.

Figure 5:
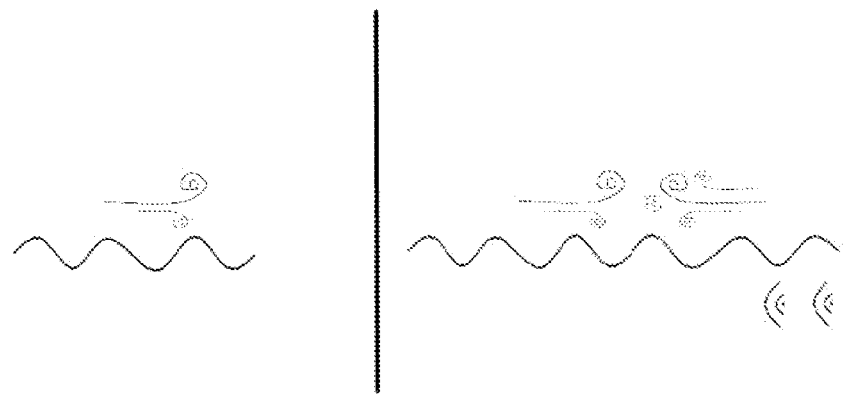

FIG. 5: The fifth drawing illustrates the fourth claim, that propagating sound underwater can be used to slow waters, and mitigate winds, propelled by prior propagation of sound.

4) Process to slow waters, and mitigate directed winds, propelled by prior propagation of sound.

DETAILED DESCRIPTION OF THE INVENTION

Invention: Propagating sound through bodies of water, to generate and direct wind, for the purpose of moderating and affecting weather patterns.

These are the invention's claims:

1) Process to produce, propel and direct wind(s), by propagating sound within a body of water, for the purpose of affecting weather patterns:

a. By propagating sound within a body of water, the sound forces the water to move in the direction(s) the sound is being applied.

b. The propagation of sound creates compressions and rarefactions in the water, waves, which subsequently shift pockets of air in the direction they travel.

c. Additional water evaporates due to the propagation of sound through the water. This vapor travels in the same direction the sound is applied, and creates a larger gust of wind to affect weather.

d. The shifting pockets of air, and the evaporating water, behave as directional winds, produced and guided by the propagation of sound. This wind can be utilized to affect weather patterns, as lower winds shift higher air systems.

2) Process to produce and direct wind shear, for the purpose of weakening storm systems, by propagating sound within bodies of water:

a. Wind propelled by propagating sound within a body of water (claim 1), can be directed against a storm system, such as a hurricane.

b. Directing winds against a storm can weaken the storm system, by stripping the storm of clouds and precipitation, preventing the storm from maintaining precipitation/rain.

c. The best method is to apply the sound and wind counter-current to the storm's torque and rotation. Another method is to apply the sound and wind outward from the center of the storm.

d. Although the best method may be to apply the sound in a direction counter-current to the storm's rotation, the sound may be propagated in any direction(s) necessary to strip the storm of precipitation, based on various geographical and meteorological factors around the storm, like for example, simultaneous storms.

3) Process to transport water vapor, clouds, precipitation, and atmospheric rivers in a desired direction(s), by propagating sound within the body of water beneath:

a. Propagating sound within water can generate and direct wind (claim 1) that affects weather patterns. These winds carry their own moisture.

b. The lower winds being directed by the propagation of sound, then also shift clouds and air systems higher in the atmosphere, or along the same altitude.

c. This process may be utilized to guide precipitation systems, and adjust precipitation cycles.

4) Process to slow waters, and mitigate directed winds, propelled by prior propagation of sound.

It is a known scientific concept that propagating sound in water generates motion: rarefactions and compressions. Patent Law allows inventors to patent new, inventive uses for known scientific processes. The invention utilizes sound's quicker and more efficient energy transfer in compressed liquids, and claims a new use for the principle.

The invention introduces a new subject matter compared to prior art in underwater acoustics: moderating weather patterns. By propagating sound within sea water, the invented processes grant an opportunity for humanity to guide and alter weather patterns, by generating and directing the wind(s).

Hurricanes are known to decrease in strength if enough wind shear effects a storm, opposite of their momentum.

However, wind shear is often a factor of chance, and the intersection of uncontrolled weather patterns, which determine whether a storm will become stronger or weaker. This invention gives humanity a manual process of generating wind, so that practitioners can produce wind shear to strip a storm of its momentum and precipitation. Directing waters and wind with soundwaves grants a method to interfere in hazardous weather events.

For stripping a hurricane of its precipitation, the best mode involves directing the sound in a direction counter to the hurricane's spin. So, in the Northern Hemisphere, where hurricanes spin counter-clockwise, you would apply the sound to direct the water and wind at a clock-wise tangent against the storm. Another method might apply the soundwaves in multiple direction away from the eye, in effect, pushing the precipitation out from the center of the storm, in 360 degrees. However, depending on various meteorological and geographic factors, the sound might be propagated in directions that are not necessarily counter-current to the hurricane's rotation, to weaken a storm.

This invention also grants a process to direct moist air and precipitation to preferential regions, rather than relying on the natural precipitation cycle. For example, while East of the US is susceptible to hurricanes and storms, the West is more at risk of drought. Using soundwaves to direct the movement of clouds and precipitation can mitigate risk of drought in the Western States, by shifting rain clouds from the Western Pacific Ocean to the Eastern Pacific Ocean, (towards the Western United States). The invention grants a manual process to direct atmospheric rivers and precipitation.

Utilizing soundwaves to guide wind(s) and affect weather patterns is a novel, useful, and non-obvious invention.

The invention is novel because no prior invention, to Mr. Osinaike's knowledge, disclosed an invention purposed to control aerial weather patterns, by applying soundwaves under water. The United States has experimented with multiple other research initiatives and experiments in attempts to weaken hurricanes. Project Cirrus, Project Baton, and Project Storm-Fury were all attempts to weaken hurricanes that eventually were canceled. Project Cirrus attempted to weaken hurricanes by dropping crushed dry ice into the clouds. Project Baton seeded storms with other chemicals and dry ice. Project Storm-fury attempted to use silver iodide. These projects were also novel attempts to solve a complex problem. Unfortunately, they failed, but they demonstrated an understanding of the necessity to defend the country from a dangerous force of nature.

This invention is novel because it capitalizes on a law of physics in an inventive way, to give our country and other nations, a manual way to weaken storms.

The invention is also useful. Weakening hurricanes and resolving drought are both issues of priority. Both storms and drought have a tremendous effect on agriculture and infrastructure. Hurricanes can damage infrastructure at a dangerous rate in their peak seasons, which leads to tremendous construction and repair costs. On the other hand, drought can also be damaging to infrastructure. If a city, suffering from drought, draws too much water from underground aquifers, this reliance can cause soil to sink, which poses risk to infrastructure. So, there are risks on both sides of changing precipitation cycles. This invention is useful because it helps mitigate risks due to climate change.

The invention is non-obvious as well. Prior art had not described the invention in a manner that the inventive nature of this patent was obvious, prior to Mr. Osinaike's disclosure.

Mr. Osinaike's provisional patent application, and non-provisional patent application, are submitted within the grace period for inventors to file patents, after disclosing their invention for public use. Mr. Osinaike believes his invention has already been utilized to weaken storm systems and mitigate drought.

The invention claimed is:

1. Process to modify weather patterns, comprising steps:
Propagating sound through a body of water,
Near a storm system,
Where propagation of sound performed in desired direction relative to the directional rotation of a storm system,
Causing water to evaporate from the ocean,
Where evaporating water inherits directional momentum from the propagation of the sound,
And directed water vapor behaves as wind shear, causing water vapor, clouds to move in desired direction.

2. Process to modify weather patterns, comprising steps:
Propagating sound through a body of water,
Near a storm system,
Where propagation of sound directed counter current against the directional rotation of a storm system,
Causing water to evaporate from the ocean,
Where evaporating water inherits directional momentum from the propagation of the sound,
And directed water vapor behaves as wind shear, stripping precipitation from the storm.

3. Process to modify weather patterns, comprising steps:
Propagating sound through a body of water,
Near a storm system,
Where propagation of sound directed cross current, in relation to the directional rotation of a storm system,
Causing water to evaporate from the ocean,
Where evaporating water inherits directional momentum from the propagation of the sound,
And directed water vapor behaves as wind shear, stripping precipitation from the storm.

4. Process to modify weather patterns, comprising steps:
Propagating sound through a body of water,
Near a storm system,
Where propagation of sound directed, tangential to the directional rotation of a storm system,
Causing water to evaporate from the ocean,
Where evaporating water inherits directional momentum from the propagation of the sound,
And directed water vapor behaves as wind shear, stripping precipitation from the storm.

* * * * *